United States Patent [19]
Coleman et al.

[11] Patent Number: 5,354,175
[45] Date of Patent: Oct. 11, 1994

[54] WIND TURBINE ROTOR HUB AND TEETER JOINT

[75] Inventors: Clint Coleman; William T. Kurth, both of Warren; Joseph Jankowski, Stowe, all of Vt.

[73] Assignee: Northern Power Systems, Inc., Moretown, Vt.

[21] Appl. No.: 113,963

[22] Filed: Aug. 30, 1993

Related U.S. Application Data

[63] Continuation of Ser. No. 851,904, Mar. 16, 1992, abandoned.

[51] Int. Cl.⁵ ............................................. F03D 1/06
[52] U.S. Cl. ........................................ 416/9; 416/44; 416/47; 416/140; 416/134 R
[58] Field of Search .............. 416/9, 10, 11, 44, 46, 416/47, 48, 102, 134 R, 135, 140, 148; 92/85 A

[56] References Cited

U.S. PATENT DOCUMENTS

| | | | |
|---|---|---|---|
| 1,539,273 | 5/1925 | Reed | 416/214 |
| 2,454,058 | 11/1948 | Hays | 416/9 |
| 3,495,965 | 2/1970 | Kurtz et al. | 92/85 A |
| 4,352,634 | 10/1982 | Andrews | 416/46 |
| 4,415,813 | 11/1983 | Carme | 416/150 |
| 4,515,525 | 5/1985 | Doman | 416/11 |
| 4,557,666 | 12/1985 | Baskin et al. | 416/11 |
| 4,838,761 | 6/1989 | Sheppard | 416/148 |
| 4,913,411 | 4/1990 | Collins et al. | 416/148 |

FOREIGN PATENT DOCUMENTS

| | | | |
|---|---|---|---|
| 3115186 | 11/1982 | Fed. Rep. of Germany | 416/140 R |
| 2372972 | 8/1978 | France | 416/134 R |

*Primary Examiner*—Edward K. Look
*Assistant Examiner*—James A. Larson
*Attorney, Agent, or Firm*—Fish & Richardson

[57] ABSTRACT

A rotor hub is provided for coupling a wind turbine rotor blade and a shaft. The hub has a yoke with a body which is connected to the shaft, and extension portions which are connected to teeter bearing blocks, each of which has an aperture. The blocks are connected to a saddle which envelops the rotor blade by one or two shafts which pass through the apertures in the bearing blocks. The saddle and blade are separated by a rubber interface which provides for distribution of stress over a larger portion of the blade. Two teeter control mechanisms, which may include hydraulic pistons and springs, are connected to the rotor blade and to the yoke at extension portions. These control mechanisms provide end-of-stroke damping, braking, and stiffness based on the teeter angle and speed of the blade.

17 Claims, 8 Drawing Sheets

FIG. 2A  FIG. 2B

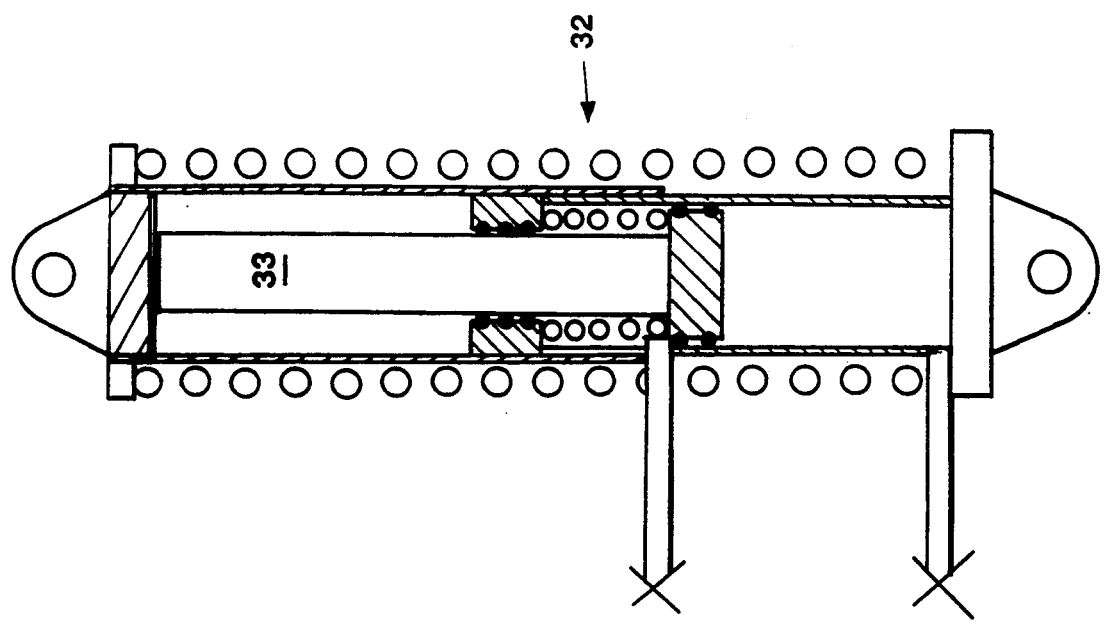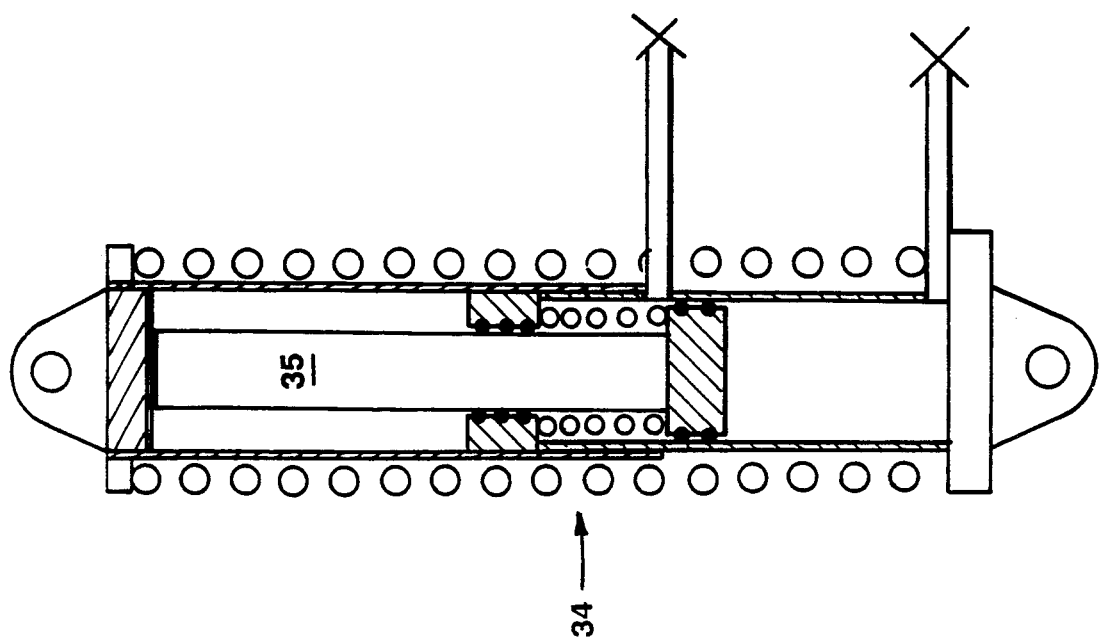
FIG. 6

WIND TURBINE ROTOR HUB AND TEETER JOINT

STATEMENT OF RIGHTS

The Government has rights in this invention pursuant to Subcontract No. ZG-0-19090-2 awarded by the U.S. Department of Energy.

This is a continuation of application Ser. No. 07/851,904, filed Mar. 16, 1992, now abandoned.

BACKGROUND OF THE INVENTION

This invention relates to a hub and teeter assembly for a wind turbine.

In a wind turbine, the connection between the rotor blade and the low speed shaft is one of the most critical areas on the entire wind turbine. This interface is commonly referred to as the hub. A teeter control mechanism controls rotor movement normal to the plane of the rotor. The combination of the two is commonly referred to as the hub and teeter joint.

The cost, complexity, and weight of the hub are important aspects to be considered in its design for an efficient wind turbine. Previously developed turbines have had significant complexity in the integration of a blade root, hub connection, blade pitch links, teeter joint, and teeter control system.

SUMMARY OF THE INVENTION

In one aspect, this invention features a rotor hub which includes a saddle which envelops the rotor blade, and a layer of elastomeric material between the saddle and the blade. A yoke is connected to a main shaft at its rearward end, and is coupled to the saddle.

In preferred embodiments, the yoke is connected to teeter bearing blocks which have apertures and elastomeric bearings fitted in the inner surfaces of the apertures. The layer between the saddle and the blade is a rubber filling which is preloaded for isolating the blade and the saddle and for distributing stresses. The saddle consists of two substantially symmetric portions which are bolted together around the flapwise surfaces of the rotor blade. The bearing blocks and saddle are coupled by two shafts, one through each aperture and connected to the saddle.

In another aspect, this invention features a rotor hub which includes a yoke with a body connected to a drive shaft at a rearward end. The yoke has two extension portions to which teeter control mechanisms are attached. The teeter control mechanisms are also each attached to the rotor blade, one on each side of the center of the rotor blade.

In the preferred embodiment, these teeter control mechanism are hydraulic pistons with interior or exterior springs for providing teeter damping, end-of-stroke snubbing, and varying stiffness depending on conditions. The yoke may further comprise two bumper extension portions, each having teeter bumpers at the end. The bumpers are positioned close to the blade to provide a physical stop for extreme teetering. The yoke may also have two teeter bearing extension portions, each connected to a teeter bearing block which has an aperture for a shaft. The blade is enveloped by a saddle and a shaft passes through at least one of the apertures and is connected to the saddle.

In yet another aspect, this invention provides two teetering control mechanisms, each coupled to a yoke assembly and to outer portions of the rotor blade. The mechanisms each comprise a hydraulic piston, and may include a hydraulic system which includes a pump, accumulator, reservoir, and manifolds. At low RPM, the system substantially prevents the blade from teetering. In a predetermined operating range of teeter angles, the teeter control mechanisms apply no damping force. If the teeter angle exceeds the predetermined range, the mechanisms provide a damping force to the rotor blade. The piston is also provided with a cushion to significantly increase damping just prior to the end-of-stroke.

A rotor hub for a wind turbine is described which is cost effective and free from undo complexity. The hub is relatively lightweight in order to provide improved performance and reliability for a high output wind turbine. The simplified rotor hub does not contain any aspects of the rotor controlled elements in the hub by locating all of the control elements on the outboard blade with only an electrical connection pathway necessary through the rotor hub interface.

Furthermore, the rotor hub allows for blade bending loads to pass through the hub without a structural interface. The only loads transferred to the hub are thrust and torque under normal operating conditions. The major blade loads, out of plane bending and centrifugal force, are not required to make a transition through the hub. The central encompassing saddle has a preloaded rubber interface which limits the point loading and provides a stress distribution into a large section of the rotor blade, resulting in a flow through rotor with a simplified load path for the rotor torque and thrust by means of interaction of the rotor blades with the saddle casting. These and other advantages are provided by means of the saddle casting arranged to transfer the rotor thrust and torque loads to the yoke through elastomeric teeter bearings.

The teeter system incorporates elastomeric teeter bearings, end-of-stroke damping, teeter braking, and appropriate levels of teeter stiffness in the three principal directions, i.e. radially, torsionally, and transversely. The teeter control system uses a combination of hydraulic, electrical, and mechanical elements to provide RPM activated teeter braking.

Other features and advantages will be apparent from the following description of a preferred embodiment and from the claims.

BRIEF DESCRIPTION OF THE DRAWING

FIG. 6 is a schematic representation showing the interconnectedness of the hydraulic controls during low RPM.

DESCRIPTION OF THE PREFERRED EMBODIMENT(S)

Figure 1:
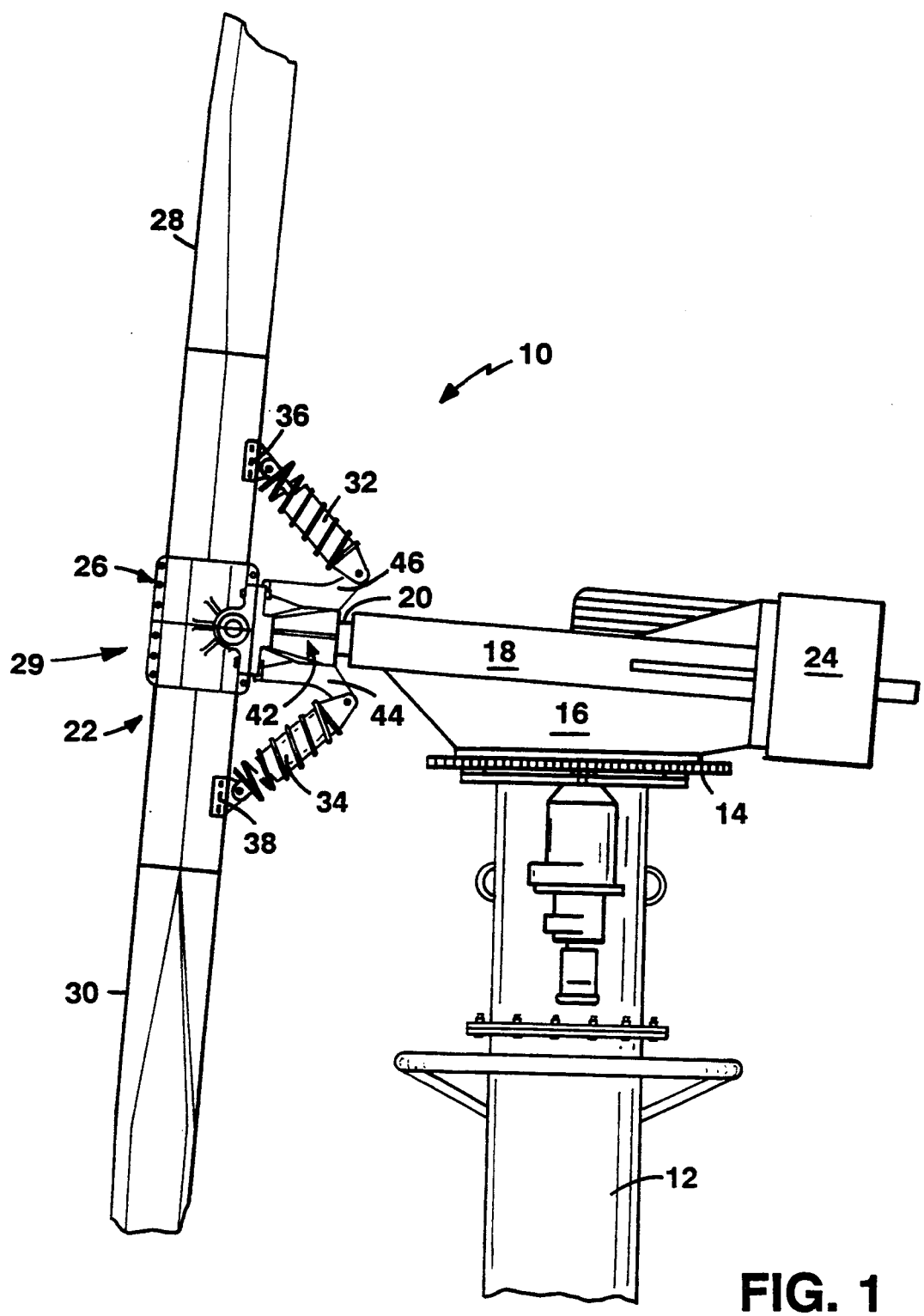
FIG. 1 is a pictorial view of a two-blade wind turbine.

FIG. 1 illustrates an installation for an upwind, stable yaw, two-bladed wind turbine 10 that generates electricity for synchronous interconnection with an electrical utility grid. A wind turbine is rotatably mounted on pole tower 12 and supported on a horizontal turntable assembly 14 about seventy feet above the ground. Mounted on turntable assembly 14 is carriage 16 rotatable in the yaw direction about the vertical axis of the turntable assembly. Carriage 16 supports a drive shaft housing 18 in which a high-torque, hollow drive shaft 20 is journalled. Drive shaft 20 is connected at its forward end to yoke 42, and at its rearward end to gear box 24.

Twin-bladed rotor 22 is mounted to hub 26 for rotation. Hub 26 carries the single piece rotor which has outer blade portions 28 and 30 and a center blade portion 29. An example of a teetering hub is presented in U.S. Pat. No. 4,435,646 assigned to North Wind Power Company, Inc., the former name of the assignee of the present application, and specifically FIG. 6 thereof which details a partial cross-sectional view of a hub/teeter assembly. Teeter control mechanisms 32, 34 are each connected at one end to respective blade parts 28, 30 at connections 36, 38 and at the other end to lower extension arms 44, 46 of yoke 42.

Figure 2:
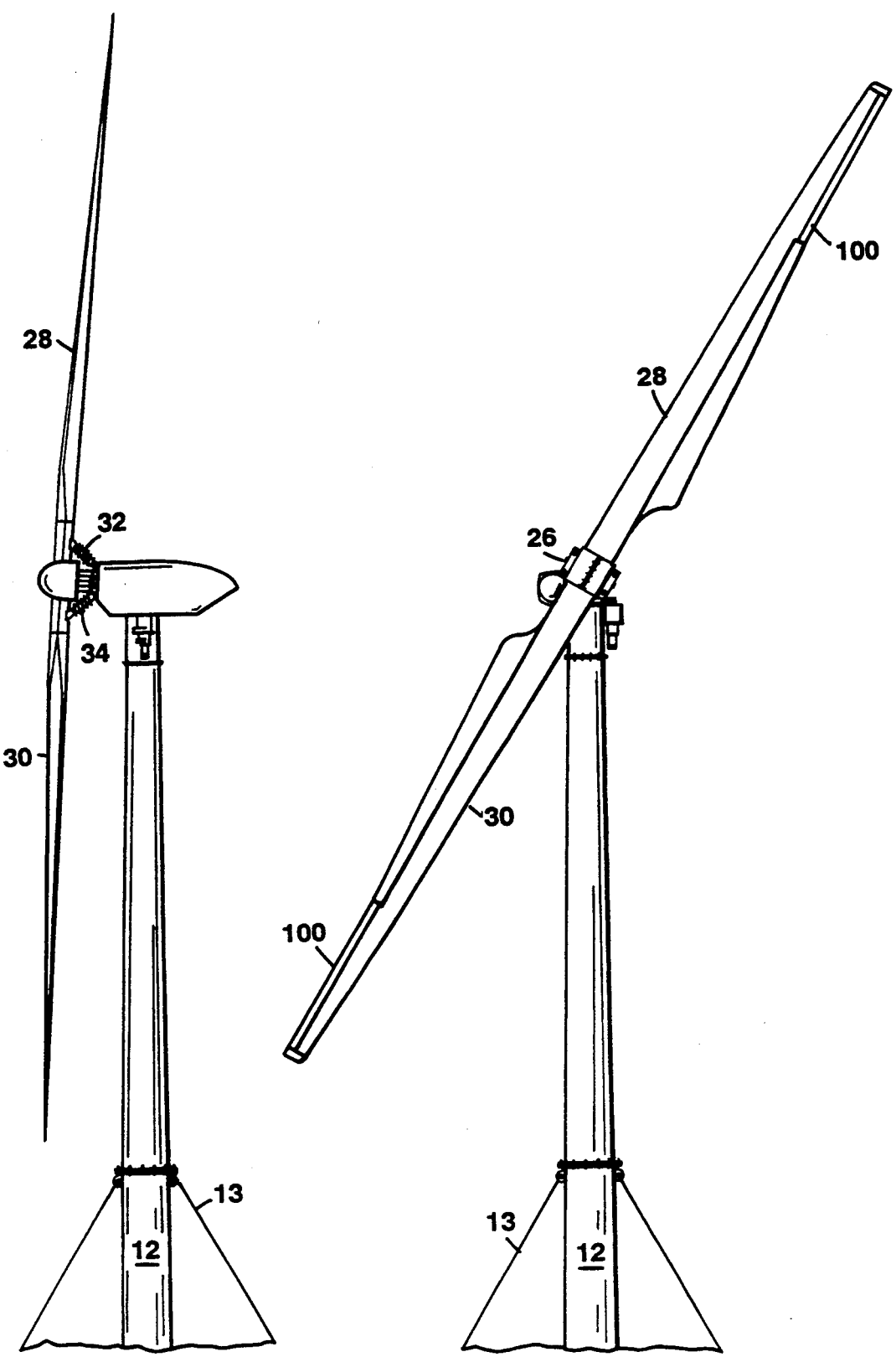
FIG. 2A and 2B are pictorial side views of the turbine.

Referring to FIG. 2A, a side view presents the position of teeter control mechanisms 32, 34 with respect to the full length of the rotor blade which is about seventy feet long. FIG. 2B is a front view including ailerons 100 on sections of each rotor blade. In FIGS. 2A and 2B, pole tower 12 is further supported by guyed wires 13.

Figure 3:
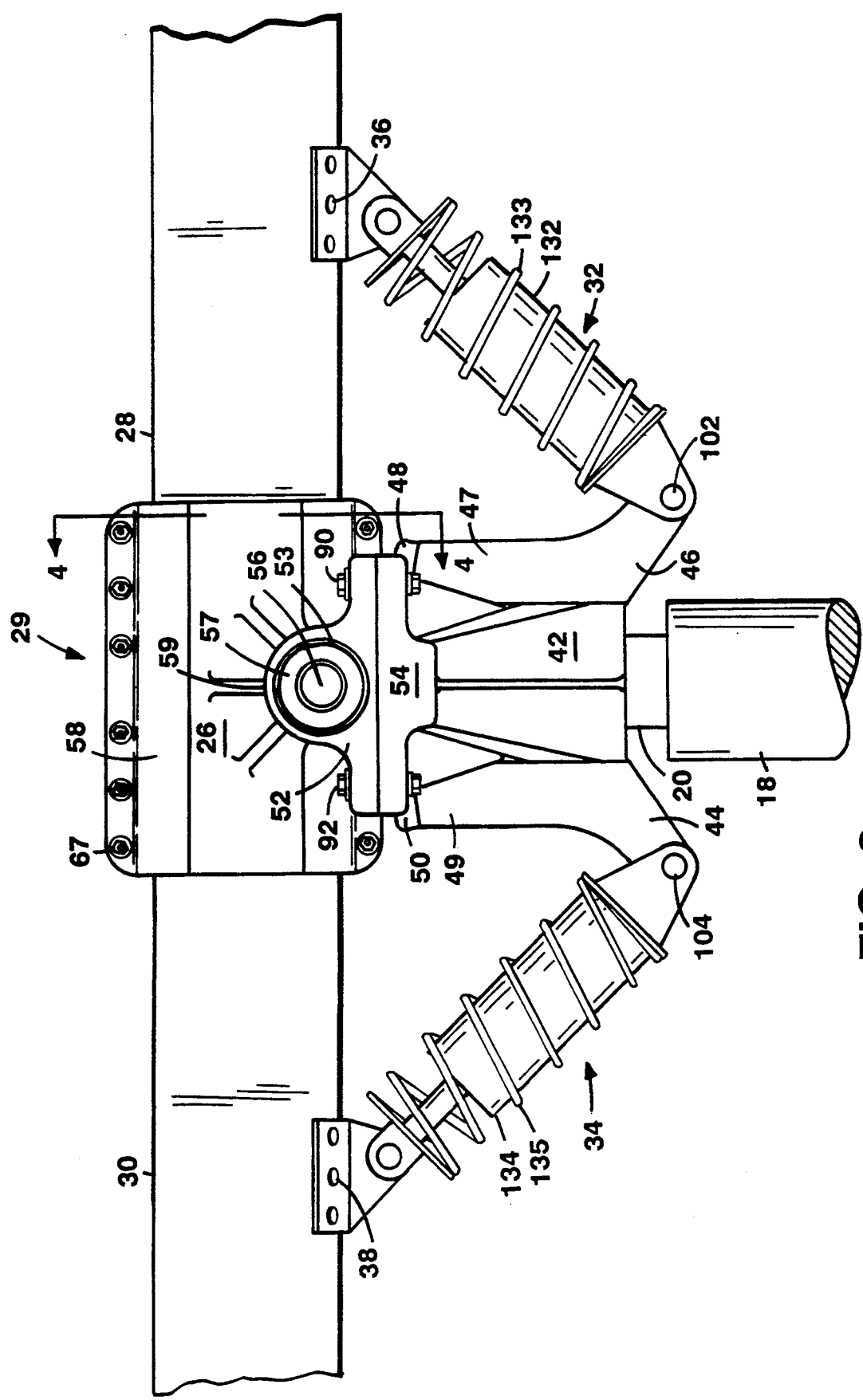
FIG. 3 is a pictorial view of the hub and teeter assembly.

Referring to FIG. 3, main shaft 20 extends from main shaft housing 18 into yoke 42. Shaft 20 is tapered slightly within yoke 42, and is connected to the yoke by a heat shrink joint (not shown). Each teeter control mechanism 32, 34 is connected to lower extension arm 44, 46 at the base of yoke 42 by bolts (not shown) at holes 102, 104 at one end. Each mechanism is attached at the opposite end to rotor blade portion 28, 30 at bracket 36, 38. Mechanisms 32, 34 include hydraulic pistons 132, 134 and springs 133, 135, and each mechanism is about thirty inches long. Teeter bumper 48, 50 is positioned at the end of each upper extension arm 47, 49 of yoke 42.

Teeter bearing block 52 is mounted on support platform 54 of yoke 42, with teeter shaft 56 running through an aperture in teeter bearing block 52. Another teeter shaft 55 (FIG. 4) is attached to saddle 58 and runs through the other bearing block. Shaft 56 is held by bronze washer 57 and locknut 59. Block 52 is bolted to platform 54 by taper pins 90 and 92 which allow easy assembly and disassembly.

Figure 4:
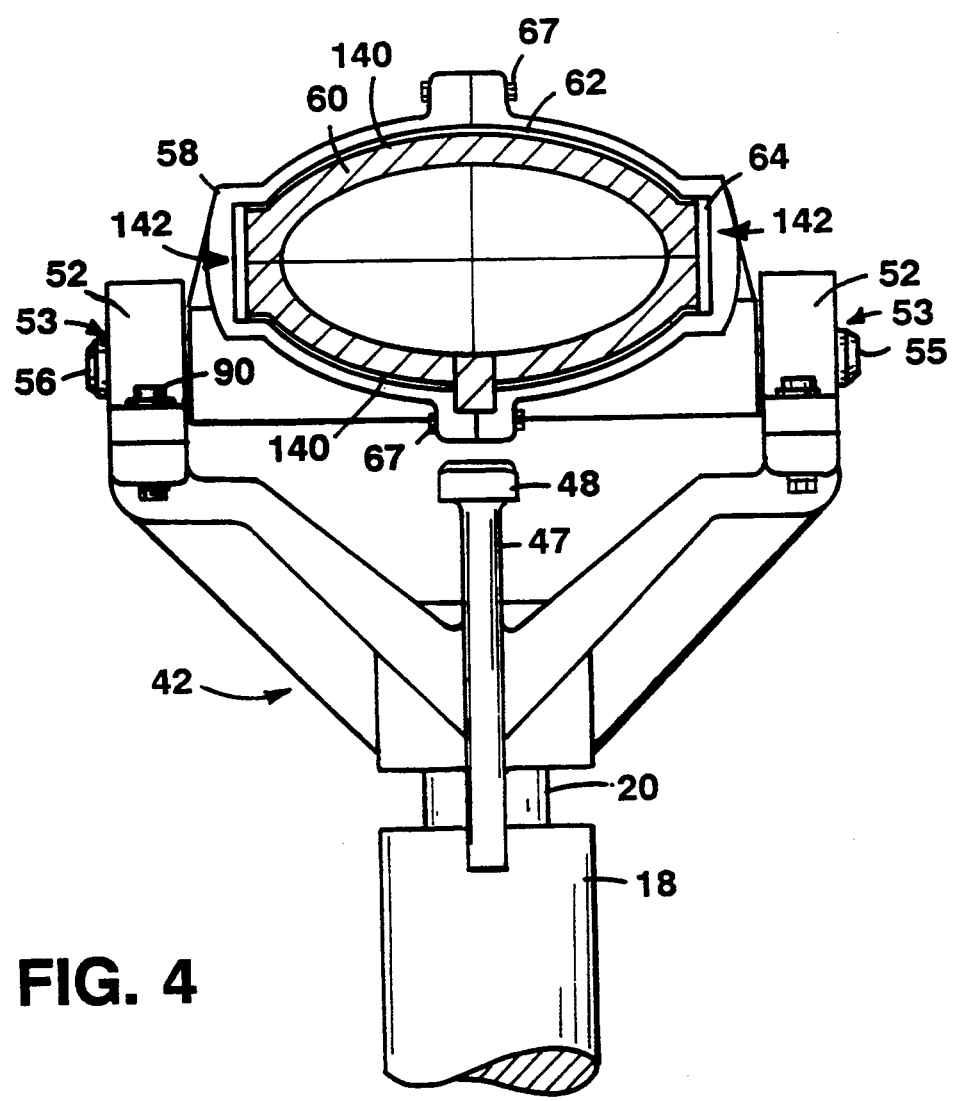
FIG. 4 is a pictorial view of the hub and teeter, through plane 4—4 of FIG. 3.

Referring to FIG. 4, oval blade section 60 is surrounded on its top and bottom flapwise surfaces by a ⅛ inch layer of rubber filler 62. On the narrower two opposing edgewise surfaces 142 of blade 60 is a layer of rubber filler 64, which is thicker than the layer 62. Blade section 60 is thus enveloped by saddle 58. The rubber filler is a preloaded interface which limits point loadings and provides stress distribution into a large section of the rotor blade.

Saddle 58 is connected to teeter shafts 56 and 55 which each extend through one of the two teeter bearing blocks 52. The teeter shafts are stainless steel pins which are attached by heat shrinking one to each half of the saddle.

Teeter bearings, represented at 53 (FIG. 3), are sleeve-like elastomeric bearings which are about four inches long and are pressed into the inside diameter of the holes in teeter blocks 52 through which shafts 55 and 56 pass. Elastomeric bearings exhibit excellent maintenance-free performance, and can be removed without disassembling the rotor and the saddle.

Saddle 58 is formed from two symmetrical halves which are made from aluminum and are attached with pins or bolts 67. The two halves are split along flapwise surfaces 140 of the rotor blade. Saddle 58 transfers the rotor thrust and torque loads to yoke 42 through the teeter bearings. The yoke, in turn, transfers these loads to the main shaft.

Figure 5:
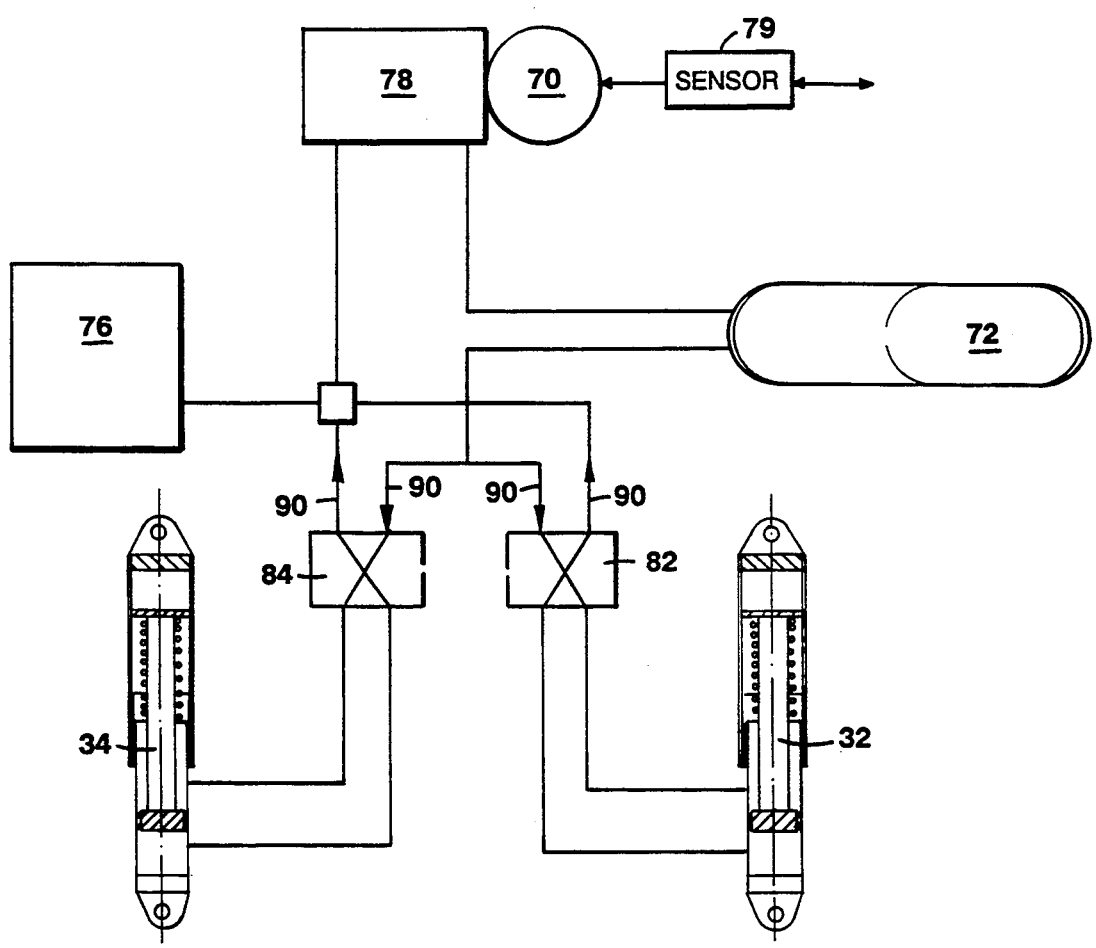
FIG. 5 is a schematic of the hydraulic control system.
Figure 5A:
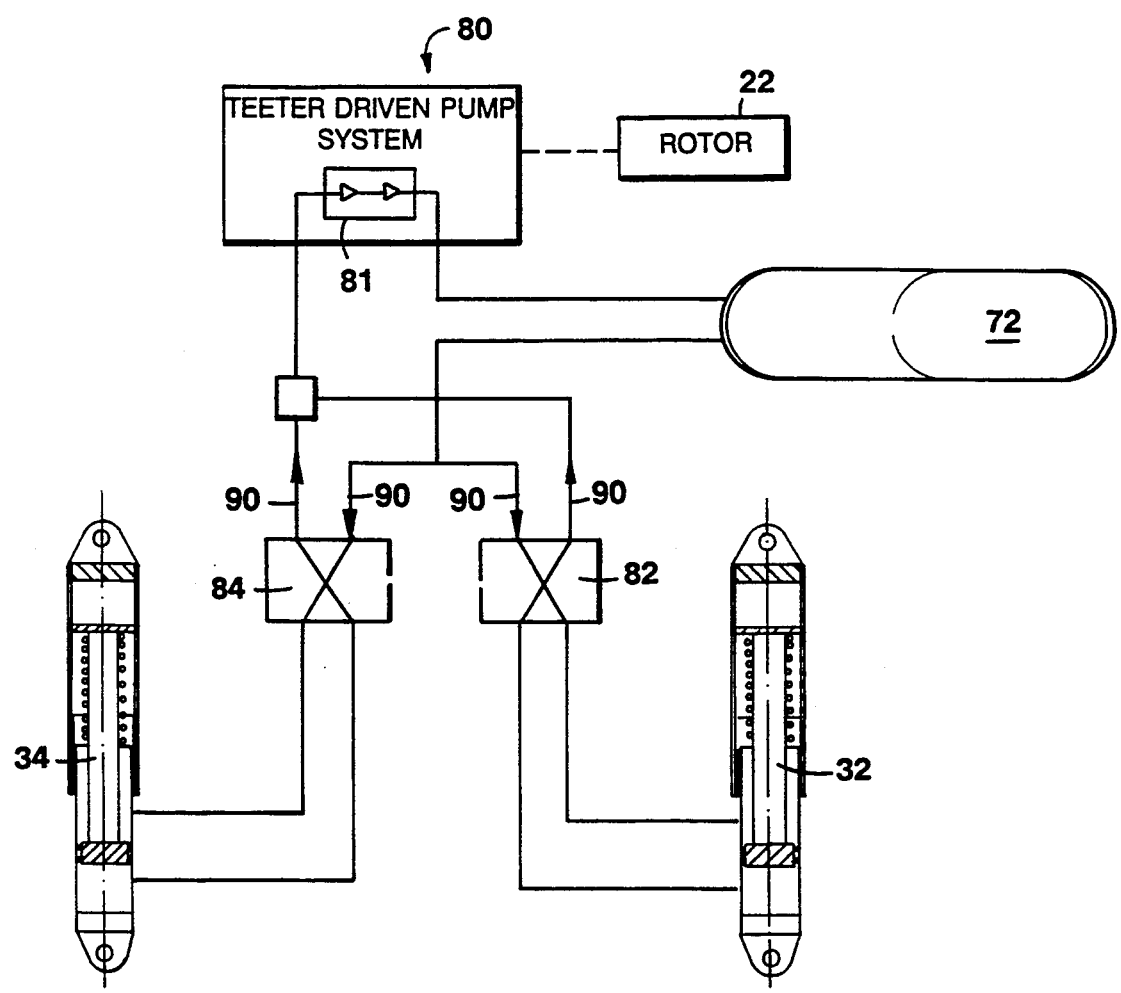
FIG. 5A is a schematic diagram of the hydraulic control system of FIG. 5, modified to employ the teetering action as a pump.

The hydraulic system of FIG. 5 is used to control the teeter control system of the wind turbine. Teeter control mechanisms 32, 34 are each connected to manifolds 82, 84 which control the direction of fluid flow between the two teeter control mechanisms in the directions shown by arrows 90. The hydraulic system also includes reservoir 76, pump 78, pump motor 70, and accumulator 72. Alternatively, the system may eliminate the pump and reservoir by using the teetering action as a pump 80, and by employing appropriate valving 81 (FIG. 3A). The teetering would pump oil to the accumulator until it was sufficiently pressurized.

At times of low wind and low RPM the teeter joint is restricted from all motion by placing the system in a teeter braking or locking position. Otherwise, teeter excursions can vary widely since there is not enough centrifugal force to stabilize the joint. The braking position is employed when the blade rotates at less than about 50% of regular operating speed. Sensor 79 is used to determine when teeter braking should occur. Teeter braking is accomplished by pressurizing the inboard end of the hydraulic cylinder of each teeter control mechanism 32, 34 and sealing the flow path, as shown in FIG. 6. Pressurized accumulator 72 provides the stored energy to accomplish this. Electrical pump 78, shown in the hydraulic actuator system of FIG. 5, provides the charge in accumulator 72. This yields a braking force on the hydraulic piston 33, 35 in the teeter control mechanisms 32, 34.

In normal operation, teeter excursion is from $+2.5°$ to $-2.5°$. Analysis conducted of the teeter response suggests that 95% of the operational time the teeter motion will be within this margin. Operating at a 100 kW output, the variance in the teeter motion was measured as less than 1°. For normal operations as this, no damping is necessary and the hydraulic system will see no motion forces or fluid flows. In this manner, the life of the hydraulic elements is extended dramatically. An internal spring (not shown) resets the hydraulic piston in each teeter control mechanism to the neutral $\pm 2.5°$ position during normal operation.

Figure 7:
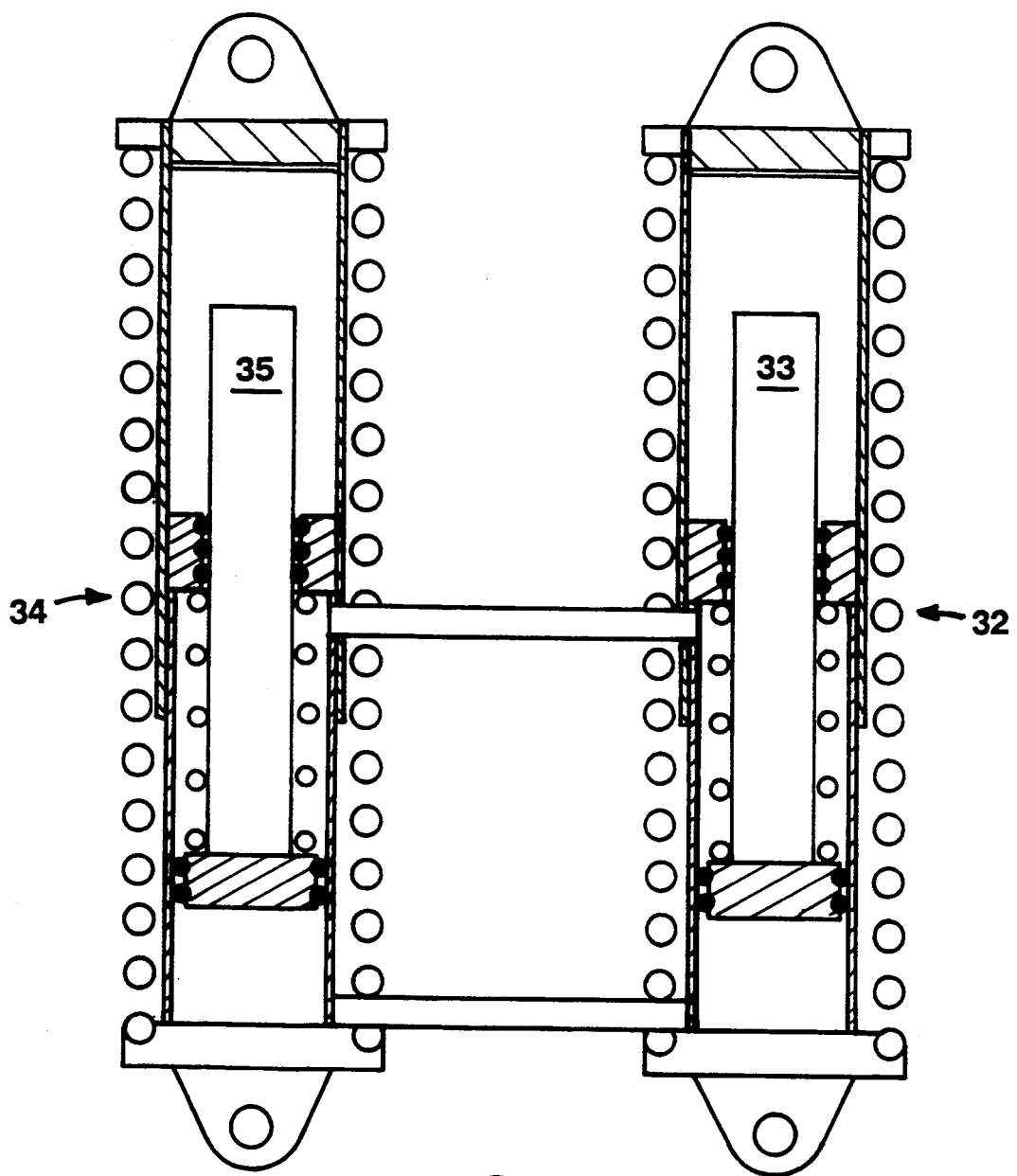
FIG. 7 is a schematic representation showing the interconnectedness of the hydraulic controls during normal operation.

When due to extreme turbulence or other discrete wind conditions, the teeter angle exceeds $\pm 2.5°$ the teeter system increases the effective stiffness and hydraulic damping occurs. This is illustrated in FIG. 7 showing the teeter control in its normal position with free motion. The peak hydraulic damping force applied to the pistons of the teeter control for such moderately high teeter events is 10,000 lbs.

As the teeter motion approaches the end of travel under conditions exceeding the moderately high events referred to above, the hydraulic piston reaches the bottom of its stroke and a built-in cushion provides an increase of four times in damping force prior to hitting the hard stop.

Teeter bumpers 48 and 50, which are built into the yoke casting, provide further passive physical control over extreme teetering.

Other embodiments are within the following claims. For example, the teeter control mechanisms can be mechanical devices without a hydraulic system. The mechanisms could have bi-directional elastomeric assemblies attached to the rotor blades. A sensor determines a low RPM condition and causes elastomeric bumpers to increase force against the rotor blade to reduce teetering. At higher RPM, the bumpers would allow substantially free motion in a operating range but would provide a damping force at greater teetering angles. If the hydraulic assembly is employed, the speed sensor can provide appropriate porting of the pistons.

The teeter control mechanisms can be coupled to the rotor blade at the saddle rather than to brackets which are attached to the blade. In this case, the saddle is widened and the mechanisms are attached to the bolts which hold the two halves of the saddle together, so that extra holes need not be cut in the rotor blade. The teeter shafts could be replaced with one shaft passing through both teeter blocks if the saddle were larger so that the shaft could pass without contacting the blade. The springs used with the hydraulic pistons can be interior springs.

What is claimed is:

1. A wind turbine comprising:
   a rotor hub for connecting a rotor blade which rotates in a plane to a drive shaft, said rotor blade having a lengthwise dimension and a center relative to the lengthwise dimension, and a central portion which includes said center, said hub comprising
   a yoke assembly comprising
      a body attached to said drive shaft at a rearward end of said body,
      two extension portions, each extending from said body, and
      two teeter blocks, each connected at the end of said extension portions, each of said teeter blocks coupled to said rotor blade at said central portion in a manner which allows said rotor blade to teeter in a plane normal to the plane in which said rotor blade rotates,
   said wind turbine further comprising two selectively damping teeter control mechanisms, each connected to said yoke assembly and each coupled to said rotor blade, wherein one mechanism is coupled on either side of said center of said blade, said teeter control mechanisms selectively providing a damping force to said rotor blade.

2. The wind turbine of claim 1 wherein said yoke assembly further comprises two winged extension portions near said rearward end, one on either side of said center of said blade, with one of said teeter control mechanisms connected to one of said winged extension portions and the other teeter control mechanism connected to the other winged extension portion.

3. The wind turbine of claim 1 wherein each said teeter control mechanism is coupled to said rotor blade by a bracket.

4. An active teeter control system for a wind turbine, wherein said turbine comprises a rotor blade and a shaft, said blade and said shaft connected by a rotor hub at a central portion of said rotor blade, said rotor blade having at least two outer blade portions, one on either side of said central portion, said outer portions teetering at a teeter angle and rotating at a speed, said system comprising:
   a first selectively damping teeter control mechanism coupled to said hub and to one of said two outer blade portions, and
   a second selectively damping teeter control mechanism coupled to said hub and to the other of said two outer blade portions,
   each of said teeter control mechanisms selectively providing a damping force to its corresponding outer blade portion.

5. The teeter control system of claim 4 wherein said first and second teeter control mechanisms comprise hydraulic pistons.

6. The teeter control system of claim 5, wherein said hydraulic pistons are components of a hydraulic system, said hydraulic system further comprising two manifolds and an accumulator.

7. The system of claim 6 further comprising valving which allows the teetering of said rotor blade to provide pumping for said hydraulic system.

8. The teeter control system of claim 6 wherein said first and second control mechanisms provide a damping force to substantially prevent teetering in response to a determination that said speed is less than a predetermined threshold.

9. The teeter control system of claim 6 wherein said first and second control mechanisms provide substantially no camping force when said teeter angle of at least one portion of said blade is between a predetermined range of angles, and in response to a determination that said speed is greater than a predetermined threshold.

10. The teeter control system of claim 6 wherein said first and second control mechanisms provide a damping force to said blade when said teeter angle exceeds a predetermined range of angles, and substantially no damping force when said teeter angle is within said predetermined range of angles.

11. The teeter control system of claim 6 wherein said first and second control mechanisms each further comprising a cushion in each said piston for increasing damping force when either of said pistons nears the end of stroke.

12. The teeter control system of claim 6 wherein said hydraulic system further comprises a pump and a reservoir.

13. The teeter control system of claim 4 wherein said first and second control mechanisms provide a damping force to substantially prevent teetering in response to a determination that said speed is less than a predetermined threshold.

14. The teeter control system of claim 4 wherein said first and second control mechanisms provide substantially no damping force when said teeter angle of each outer portion is between a predetermined range of angles, and when said speed is greater than a predetermined threshold.

15. The teeter control system of claim 4 wherein said first and second control mechanisms provide a damping force to said blade when said teeter angle exceeds a predetermined range of angles, and substantially no damping force when said teeter angle is within said predetermined range of angles.

16. The teeter control system of claim 4 further comprising a sensor for determining the speed of said rotor blade, wherein said system:
provides a damping force to substantially prevent teetering in response to a determination by said sensor that said speed is below a predetermined threshold,
provides negligible damping when said teeter angle is between a range of angles, and in response to a determination that said speed exceeds said predetermined threshold, and
provides a damping force when said teeter angle exceeds a predetermined range of angles.

17. An active teeter control system for a wind turbine, wherein said turbine comprises a rotor blade and a shaft, said blade and said shaft connected by a rotor hub at a central portion of said rotor blade, said rotor blade having at least two outer blade portions, one on either side of said central portion, said outer portions teetering at a teeter angle and rotating at a speed, said system comprising:
a first teeter control mechanism coupled to said hub and to one of said two outer blade portions, and a second teeter control mechanism coupled to said hub and to the other of said two outer blade portions, each of said teeter control mechanisms comprising a hydraulic piston and providing a damping force to its corresponding outer blade portion, and
a hydraulic system to supply hydraulic fluid to said teeter control mechanisms, said hydraulic system including two manifolds, an accumulator, and valving which allows the teetering of said rotor blade to provide pumping for said hydraulic system.

* * * * *